United States Patent
Kang et al.

(10) Patent No.: US 9,673,884 B2
(45) Date of Patent: Jun. 6, 2017

(54) USER DEVICE AND OPERATING METHOD THEREFOR

(71) Applicant: Samsung Electronics Co., Ltd., Gyeonggi-do (KR)

(72) Inventors: Dae-Chul Kang, Gyeonggi-do (KR); Soo-Hyung Kim, Gyeonggi-do (KR); Hyu-Myung Jeon, Gyeonggi-do (KR); Tae-Il Kim, Gyeonggi-do (KR); Jong-Kui Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/907,376

(22) PCT Filed: Jul. 28, 2014

(86) PCT No.: PCT/KR2014/006853
§ 371 (c)(1),
(2) Date: Jan. 25, 2016

(87) PCT Pub. No.: WO2015/012657
PCT Pub. Date: Jan. 29, 2015

(65) Prior Publication Data
US 2016/0173185 A1    Jun. 16, 2016

(30) Foreign Application Priority Data

Jul. 26, 2013 (KR) .......................... 10-2013-0088407

(51) Int. Cl.
| H04B 7/08 | (2006.01) |
| H04B 7/06 | (2006.01) |
| H04B 17/318 | (2015.01) |

(52) U.S. Cl.
CPC ......... *H04B 7/0814* (2013.01); *H04B 7/0608* (2013.01); *H04B 7/0834* (2013.01); *H04B 7/0802* (2013.01); *H04B 17/318* (2015.01)

(58) Field of Classification Search
CPC .. H04B 17/318; H04B 7/0608; H04B 7/0802; H04B 7/0814
See application file for complete search history.

(56) References Cited

U.S. PATENT DOCUMENTS

| 2002/0106995 A1 | 8/2002 | Callaway, Jr. |
| 2009/0308232 A1 | 12/2009 | McMillen et al. |

(Continued)

FOREIGN PATENT DOCUMENTS

| KR | 10-0842722 B1 | 7/2008 |
| KR | 10-2009-0017907 A | 2/2009 |

(Continued)

*Primary Examiner* — Ross Varndell
(74) *Attorney, Agent, or Firm* — Cha & Reiter, LLC

(57) ABSTRACT

An electronic device according to one embodiment of the present disclosure may include a plurality of antennas for transmitting and receiving radio waves, at least one sensor for sensing a physical quantity or physical changes, a sensor hub for outputting a control signal in response to an output from the at least one sensor, and a communication module for controlling wireless communication using the plurality of antennas in response to the control signal. Various other exemplary embodiments are possible.

13 Claims, 19 Drawing Sheets

(56) References Cited

U.S. PATENT DOCUMENTS

| | | | |
|---|---|---|---|
| 2010/0285759 A1* | 11/2010 | Chung | H01Q 1/243 455/101 |
| 2013/0029625 A1 | 1/2013 | Park et al. | |
| 2013/0244594 A1* | 9/2013 | Alrabadi | H04B 7/0413 455/78 |

FOREIGN PATENT DOCUMENTS

| | | |
|---|---|---|
| KR | 10-2010-0120485 A | 11/2010 |
| KR | 10-2013-0013089 A | 2/2013 |
| WO | 2011/078526 A2 | 6/2011 |

\* cited by examiner

USER DEVICE AND OPERATING METHOD THEREFOR

CLAIM OF PRIORITY

This application is a National Phase Entry of PCT International Application No. PCT/KR2014/006853, which was filed on Jul. 28, 2014, and claims a priority to Korean Patent Application No. 10-2013-0088407, which was filed on Jul. 26, 2013, the contents of which are incorporated herein by reference.

TECHNICAL FIELD

Various exemplary embodiments of the present disclosure relate to a user device having a wireless communication function, and an operating method thereof.

BACKGROUND ART

With the development of electronics communication industries in recent years, a user device (e.g., a cellular phone, an electronic organizer, a personal data assistant, a laptop computer, or the like) has become necessities of modern life as an important means for delivering information which changes rapidly. The user device facilitates a user's operation through a Graphic User Interface (GUI) environment using a touch screen, and provides various multimedia based on a web environment. A thinner and lighter user device is launched due to importance of portability.

Recently, the user device has a wireless communication function as basic specifications to such an extent that it is difficult to find a user device not having the wireless communication function. According to a characteristic of a user device which can be easily carried, a user can acquire information through a network irrespective of a place.

DISCLOSURE

Technical Problem

Various exemplary embodiments of the present disclosure may avoid a deterioration of antenna performance of a user device in association with a surrounding deterioration factor (e.g., a user's body).

Various exemplary embodiments of the present disclosure may decrease a load of a processor and may decrease power consumption by using a Micro Controller Unit (MCU).

Technical Solution

According to one exemplary embodiment of the present disclosure, an electronic device may include a plurality of antennas for transmitting and receiving radio waves, at least one sensor for sensing a physical quantity or physical changes, a sensor hub for outputting a control signal in response to an output from the at least one sensor, and a communication module for controlling wireless communication using the plurality of antennas in response to the control signal.

According to another exemplary embodiment of the present disclosure, an electronic device may include a module for acquiring information from at least one sensor, a determination module for identifying a surrounding environment from the information, a signal generation module for generating a control signal corresponding to the surrounding environment, and a wireless communication module for performing wireless communication in response to the control signal.

According to another exemplary embodiment of the present disclosure, an MCU may include an acquisition module for acquiring a plurality of pieces of information from a plurality of sensors, and a signal generation module for generating a signal for controlling wireless communication from the plurality of pieces of information.

According to various other exemplary embodiments of the present disclosure, a method of operating an electronic device may include acquiring information from at least one sensor and controlling wireless communication in response to the information.

Advantageous Effects

When a user grips a user device, the user device can adaptively modify a Transmission (Tx)/Reception (Rx) configuration to cope with performance deterioration of an antenna disposed to a grip position thereof, thereby maintaining reliable Tx/Rx performance.

BEST MODE FOR CARRYING OUT THE INVENTION

Exemplary embodiments of the present disclosure will be described herein below with reference to the accompanying drawings. In the following description, well-known functions or constructions are not described in detail since they would obscure the invention in unnecessary detail. Also, the terms used herein are defined according to the functions of the present disclosure. Thus, the terms may vary depending on user's or operator's intension and usage. That is, the terms used herein must be understood based on the descriptions made herein.

According to various exemplary embodiments of the present disclosure, when a user grips a user device, a Transmission (Tx)/Reception (Rx) configuration may be adaptively modified so that reliable Tx/Rx performance is maintained to cope with performance deterioration of an antenna disposed to a grip position thereof.

According to various exemplary embodiments of the present disclosure, an antenna suitable for wireless communication may be selected in response to an output (or a sensing value) from at least one sensor (e.g., a gesture sensor, an acceleration sensor, a gyro sensor, a magnetic sensor, a grip sensor, a proximity sensor, a Red, Green, Blue (RGB) sensor, a bio sensor, a pressure sensor, a temperature/humidity sensor, an illumination sensor, an Ultra Violet (UV) sensor, or the like).

According to various exemplary embodiments of the present disclosure, weights for Rx signals and/or Tx signals through a plurality of antennas may be applied in response to an output from at least one sensor in wireless communication using a plurality of antennas.

According to various exemplary embodiments of the present disclosure, Tx power for at least one antenna may be regulated in response to an output from at least one sensor.

According to various exemplary embodiments of the present disclosure, a load of a processor may be decreased and power consumption may be decreased by performing an operation related to at least one sensor by the use of a Micro Controller Unit (MCU) which plays a role of a sensor hub, instead of a processor.

According to various exemplary embodiments of the present disclosure, at least one antenna of a user device may be used as a sensing medium by utilizing as at least one sensor.

Figure 1:
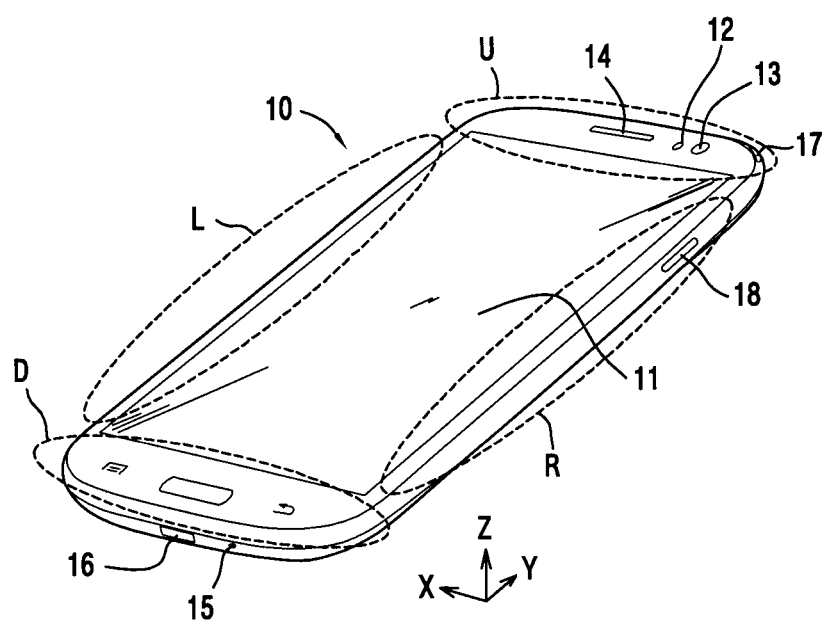
FIGS. 1 and 2 illustrate a user device according to an exemplary embodiment of the present disclosure.
Figure 2:
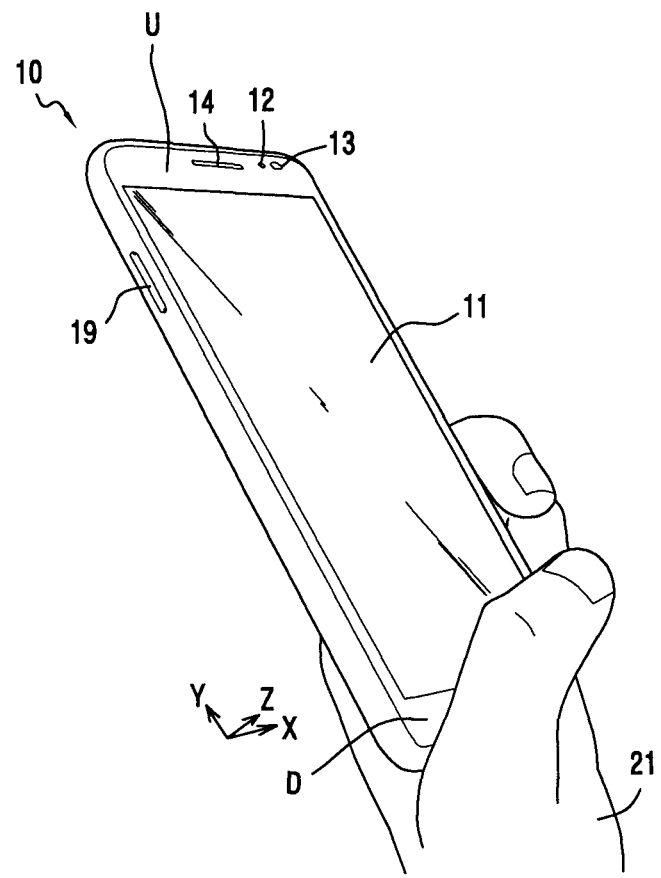

FIGS. 1 and 2 illustrate a user device according to an exemplary embodiment of the present disclosure.

Referring to FIGS. 1 and 2, a touch screen 11 for displaying an image and receiving a touch input, an illumination sensor 12 for measuring brightness, a camera 13 for capturing, and a speaker 14 for outputting an electrical signal into a sound may be disposed to a front surface of a user device 10. A microphone 15 for converting the sound into the electrical signal and a port 16 for connecting a Universal Serial Bus (USB) and for charging may be disposed to the user device 10. An antenna 17 for Digital Multimedia Broadcasting (DMB) may be disposed to the user device 10. The antenna 17 may be extended by being pulled outside. A jack (not shown) capable of electrically connecting a plug such as an earphone, an ear set, or the like may be disposed to the user device 10. A button 18 capable of turning on/off power may be disposed to the user device 10. A button 19 capable of adjusting a volume may be disposed to the user device 10. Although not shown, a camera for capturing and a flash for capturing may be disposed to a rear surface of the user device 10.

The aforementioned electronic components may be electrically connected to a Printed Circuit Board (PCB) (not shown). The PCB is a board having a basic circuitry and a plurality of electronic components mounted thereon, and may configure an execution environment of the user device 10, maintain information thereof, allow the user device 10 to be driven reliably, and allow all devices of the user device 10 to smoothly exchange data inputs/outputs. A battery (not shown) may be electrically connected to the PCB, and may supply driving power of the user device 10.

The user device 10 may have a wireless communication device for wireless communication.

Figure 3:
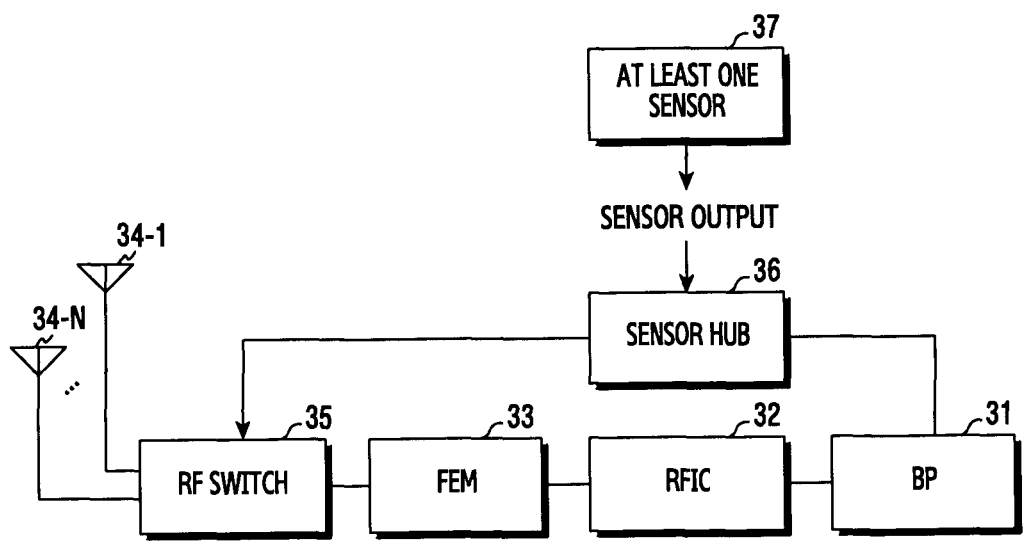
FIG. 3 is a block diagram of a wireless communication device having a structure of Single Input Single Output (SISO) according to an exemplary embodiment of the present disclosure.

FIG. 3 is a block diagram of a wireless communication device having a structure of Single Input Single Output (SISO) according to an exemplary embodiment of the present disclosure.

Referring to FIG. 3, the wireless communication device may include a Baseband Processor (BP) 31, a Radio Frequency Integrated Circuit (RFIC) 32, a Front End Module (FEM) 33, a plurality of antennas 34-N, a Radio Frequency (RF) switch 35, a sensor hub 36, and at least one sensor 37.

The BP 31 may be a baseband modem, a Communication Processor (CP), or the like. The BP 31 is a semiconductor for enabling voice communication and data communication, and may compress or decompress voice data and video data. The BP 31 may control and manage the user device 10 by integrating individual semiconductors such as a memory, a processor, a software entity, or the like. The BP 31 may use at least one of a Global System for Mobile Communication (GSM) network, an Enhanced Data GSM Environment (EDGE) network, a Code Division Multiple Access (CDMA) network, an Orthogonal Frequency Division Multiple Access (OFDMA) network, a W-Code Division Multiple Access (W-CDMA) network, an Evolution Data Optimized CDMA2000 (EV-DO) network, a High Speed Downlink Packet Access (HSDPA) network, a Long Term Evolution (LTE) network, a Wireless Fidelity (Wi-Fi) network, a WiMax network, a Global Positioning System (GPS) network, a Bluetooth network, and a Near Field Communication (NFC) network.

The RFIC 32 may perform an RF function for connecting the plurality of antennas 34-N and a system semiconductor (e.g., the BP 31). The RFIC 32 may be an RF Tx/Rx chip (e.g., an RF transceiver). When receiving a radio signal, the RFIC 32 may receive the radio signal from the at least one antenna 34-N, may convert the received radio signal into a baseband signal, and may transmit the converted baseband signal to the BP 31. The BP 31 may process the received baseband signal, and may control a human/machine interface of the user device 10 corresponding to the received baseband signal. When transmitting the radio signal, the BP 31 may generate a baseband signal and output the signal to the RFIC 32. The RFIC 32 may receive the baseband signal from the BP 31, may convert the received baseband signal into a radio signal, and may transmit the signal to the air through the at least one antenna 34-N.

The FEM 33 may be a Tx/Rx device capable of controlling a radio-wave signal. The FEM 33 may connect the plurality of antennas 34-N and the RFIC 32, and may separate Tx/Rx signals. The FEM 33 may play a role of filtering and amplifying, and may include an Rx FEM having a filter to perform filtering on an Rx signal and a Tx FEM having a Power Amplifier Module (PAM) to amplify a Tx signal.

The plurality of antennas 34-N may include a mono-pole antenna, a dipole antenna, an Inverted F Antenna (IFA), a Planar Inverted F Antenna (PIFA), a slot antenna, or the like. The plurality of antennas 34-N may be mounted on a PCB as a thin plate (e.g., a micro strip), or may be fixed to an injected material (e.g., a carrier) attached to the PCB. The plurality of antennas 34-N may be fixed to an inner surface of a housing for forming an exterior of the user device 10. The plurality of antennas 34-N may be at least one metal body (e.g., a metal boundary) for forming the exterior of the user device 10. The plurality of antennas 34-N may be installed to at least one portion among an upper portion U, a lower portion D, a left end portion L, a right end portion R, and a rear portion (not shown) of the user device 10 (see FIGS. 1 and 2).

The RF switch 35 may selectively connect the antenna 34-N to the RFIC 32 in the SISO structure under the control of the sensor hub 36.

The sensor hub 36 may be a Micro Controller Unit (MCU) for performing a specific operation in response to information from the at least one sensor 37 independent of the BP 31. The sensor hub 36 may perform a specific operation sequence in response to at least one output (e.g., sensing value) from the at least one sensor 37 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). For example, the sensor hub 36 may output to the RF switch 35 in association with a grip position and/or grip amount of a user of the user device 10 in response to at least one surrounding situation information from the at least one sensor 37.

The at least one sensor 37 may include the gesture sensor, the acceleration sensor, the gyro sensor, the magnetic sensor, the grip sensor, the proximity sensor, the RGB sensor, the bio sensor, the pressure sensor, the temperature/humidity sensor, the illumination sensor, the UV sensor, or the like. The gesture sensor may recognize a hand gesture by sensing an infrared ray reflected from a palm. The gesture sensor may sense a hand movement of a user by sensing a current change amount (or a current loss amount), a capacitance change amount, or the like in the plurality of antennas 43-N. The acceleration sensor may sense a movement state (e.g., acceleration, vibration intensity, impact intensity, or the like) of the user device 10. The gyro sensor may recognize an inclination of the user device 10 by sensing a rotation state (e.g., an inclination or an angular velocity) of the user device 10 in three axes. The magnetic sensor may sense a magnetic state (e.g., a size and direction of a magnetic field or magnetic flux line) in the three axes. The magnetic sensor may sense a change in a magnetic field formed in the plurality of antennas 34-N. The grip sensor may sense whether the user grips the user device 10. The grip sensor may sense whether the user device 10 is gripped according to a pressure change of pressing members disposed to a portion gripped by the user. The grip sensor may sense the grip of the user device 10 according to a current loss amount or a capacitance change in the at least one antenna 34-N disposed to the portion gripped by the user. The proximity sensor may sense that an object (e.g., a hand) is in proximity. The proximity sensor may recognize whether the user device 10 is located near a human body by using an infrared ray. The proximity sensor may also sense a proximity of the object according to the current loss amount, the capacitance change, or the like in the at least one antenna 34-N disposed to the portion gripped by the user. The RGB sensor may measure strength per red, green, blue, and white of a light source. The bio sensor may acquire bio information (e.g., a face recognition, an iris recognition, or a fingerprint measurement). The pressure sensor may measure pressure according to a location of the user device 10. The pressure sensor may measure pressure by using capacitance in the at least one antenna 34-N. The temperature/humidity sensor may measure temperature and humidity of a surrounding environment. The temperature/humidity sensor may measure temperature or humidity by using an electric resistance or capacitance in the at least one antenna 34-N. The illumination sensor may measure a surrounding illumination. The UV sensor may sense a UV ray.

The plurality of antennas 34-N may be used as a sensing medium for the at least one sensor 37 by being electrically connected to the at least one sensor 37 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). The at least one sensor 37 may acquire surrounding situation information (e.g., a movement of a hand, a movement of a user device, a grip of the user device, an object access to the user device, temperature, humidity, pressure, or the like) by using the plurality of antennas 34-N. For example, when the user grips the user device 10, a user's hand (or a sensing object) is brought into an electric field formed on the antenna disposed to the gripped portion, and a portion of the electric field may be connected in a ground state. The grip sensor may sense a capacitance change depending on a change in the electric field. The capacitance change of each metal pattern 34-N may vary depending on a portion at which the user grips the user device 10. As shown in FIG. 2, when the user grips a lower portion (indicated by D of FIG. 1) of the user device 10, an antenna of the lower portion D has a capacitance change, whereas an antenna of an upper portion (indicated by U of FIG. 1) may have no capacitance change or may have a relatively less significant than the capacitance change of the antenna of the lower portion D.

The at least one sensor 37 may use not only the at least one antenna 34-N but also an additionally provided metal body as a sensing medium. The metal body may be a conductive paint to be applied, a metal plate to be attached, or the like, and may be formed on an inner surface or outer surface of a housing for forming an exterior of the user device 900 or may be formed on a PCB.

Figure 4:
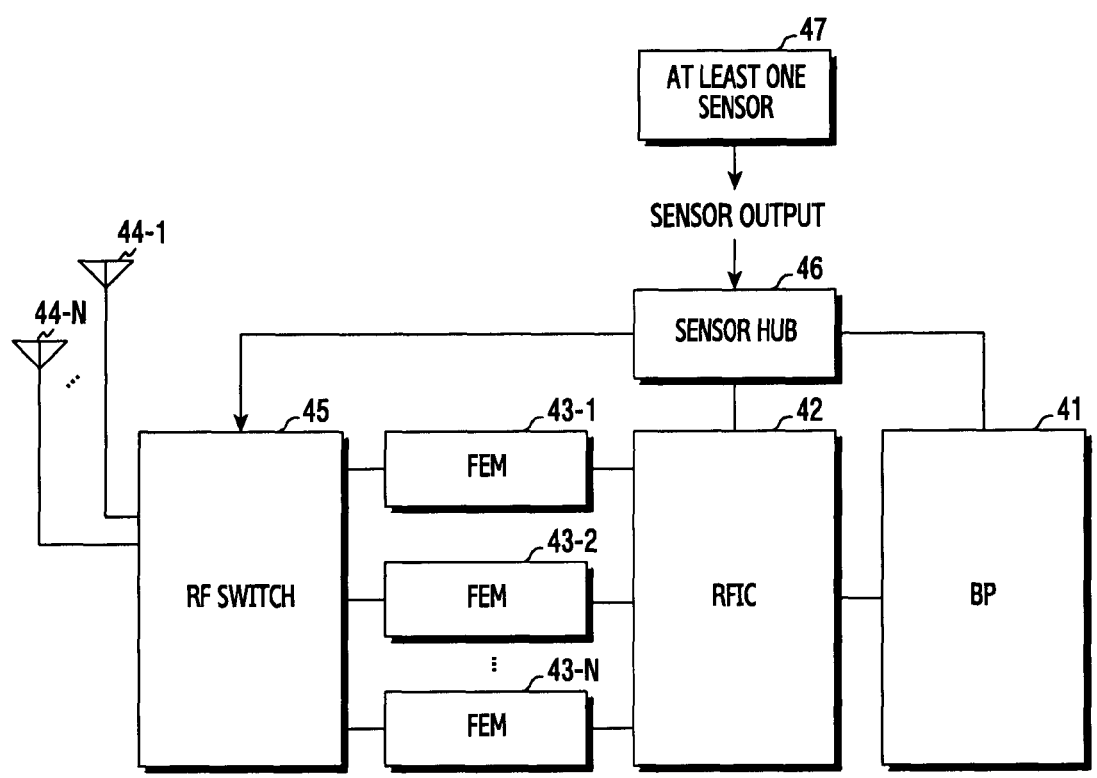
FIG. 4 is a block diagram of a wireless communication device having a structure of diversity, multiple input, or multiple output according to another exemplary embodiment of the present disclosure.

FIG. 4 is a block diagram of a wireless communication device having a structure of diversity, multiple input, or multiple output according to another exemplary embodiment of the present disclosure.

Referring to FIG. 4, the wireless communication device may include a BP 41, an RFIC 42, a plurality of FEMs 43-N, a plurality of antennas 44-N, an RF switch 45, a sensor hub 46, and at least one sensor 47.

The BP 41 may be a baseband modem, a CP, or the like. The BP 41 is a semiconductor for enabling voice communication and data communication, and may compress or decompress voice data and video data. The BP 41 may control and manage the user device 10 by integrating individual semiconductors such as a memory, a processor, a software entity, or the like. The BP 41 may use at least one of a GSM network, an EDGE network, a CDMA network, an OFDMA network, a W-CDMA network, an EV-DO network, an HSDPA network, an LTE network, a Wi-Fi network, a WiMax network, a GPS network, a Bluetooth network, and an NFC network.

The RFIC 42 may perform an RF function for connecting the plurality of antennas 44-N and a system semiconductor (e.g., the BP 41). The RFIC 42 may be an RF Tx/Rx chip (e.g., an RF transceiver). When receiving a radio signal, the RFIC 42 may receive the radio signal from the at least one antenna 44-N, may convert the received radio signal into a baseband signal, and may transmit the converted baseband signal to the BP 41. The BP 41 may process the received baseband signal, and may control a human/machine interface of the user device 10 corresponding to the received baseband signal. When transmitting the radio signal, the BP 41 may generate a baseband signal and output the signal to the RFIC 42. The RFIC 42 may receive the baseband signal from the BP 41, may convert the received baseband signal into a radio signal, and may transmit the signal to the air through the at least one antenna 44-N.

The FEMs 43-N may be a Tx/Rx device capable of controlling a radio-wave signal. The FEMs 43-N may connect the plurality of antennas 44-N and the RFIC 42, and may separate Tx/Rx signals. The FEMs 43-N may play a role of filtering and amplifying, and may include an Rx FEM having a filter to perform filtering on an Rx signal and a Tx FEM having a PAM to amplify a Tx signal.

The plurality of antennas 44-N may include a mono-pole antenna, a dipole antenna, an IFA, a PIFA, a slot antenna, or the like. The plurality of antennas 44-N may be mounted on a PCB as a thin plate (e.g., a micro strip), or may be fixed to an injected material (e.g., a carrier) attached to the PCB. The plurality of antennas 44-N may be fixed to an inner surface of a housing for forming an exterior of the user device 10. The plurality of antennas 44-N may be at least one metal body (e.g., a metal boundary) for forming the exterior of the user device 10.

Under the control of the sensor hub 46, the RF switch may selectively connect the plurality of Rx and/or Tx antennas 34-N to the RFIC 42 in a structure of Single Input Multiple Output (SIMO), Multiple Input Single Output (MISO), diversity, or Multiple Input Multiple Output (MIMO).

The sensor hub 46 may be an MCU for performing a specific operation in response to information from the at least one sensor 47 independent of the BP 41. The sensor hub 46 may perform a specific operation sequence in response to at least one output (e.g., sensing value) from the at least one sensor 47 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). For example, the sensor hub 46 may output to the RF switch 45 in association with a grip position and/or grip amount of a user of the user device 10 in response to at least one surrounding situation information from the at least one sensor 47. The sensor hub 46 may determine weights for Rx signals and/or Tx signals through the plurality of antennas 44-N used in the structure of SIMO, MISO, diversity, or MIMO in response to at least one surrounding situation information from the at least one sensor 47. The RFIC 42 may combine the Rx signals from the plurality of antennas 44-N by applying the weights determined by the sensor hub 46. The RFIC 42 may apply the weights determined by the sensor hub 46 respectively to the Tx signals output from the plurality of antennas 44-N.

The at least one sensor 47 may include the gesture sensor, the acceleration sensor, the gyro sensor, the magnetic sensor, the grip sensor, the proximity sensor, the RGB sensor, the bio sensor, the pressure sensor, the temperature/humidity sensor, the illumination sensor, the UV sensor, or the like. The at least one sensor 47 may include a sensor for measuring a Received Signal Strength Indication (RSSI) for the plurality of antennas 44-N. The at least one sensor 47 may include a sensor for measuring a Specific Absorption Rate (SAR) for the plurality of antennas 44-N.

The plurality of antennas 44-N may be used as a sensing medium for the at least one sensor 47 by being electrically connected to the at least one sensor 47 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). The at least one sensor 47 may acquire surrounding situation information (e.g., a movement of a hand, a movement of a user device, a grip of the user device, an object access to the user device, temperature, humidity, pressure, or the like) by using the plurality of antennas 44-N.

Figure 5:
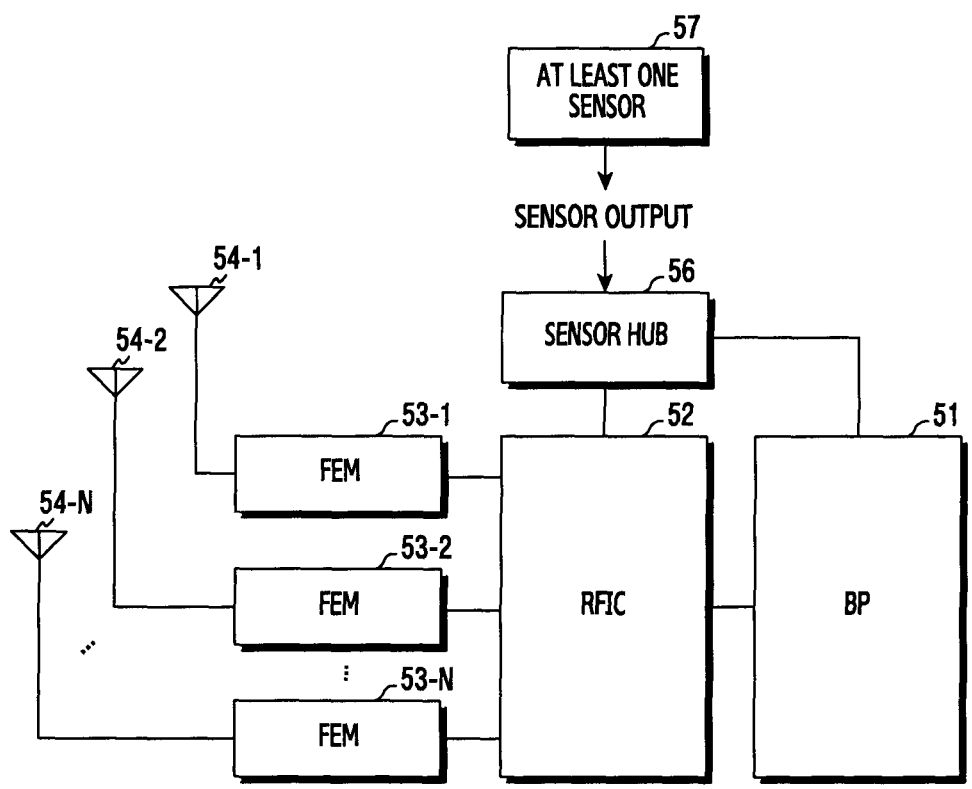
FIG. 5 is a block diagram of a wireless communication device having a structure of diversity, multiple input, or multiple output according to another exemplary embodiment of the present disclosure.

FIG. 5 is a block diagram of a wireless communication device having a structure of diversity, multiple input, or multiple output according to another exemplary embodiment of the present disclosure.

Referring to FIG. 5, the wireless communication device may include a BP 51, an RFIC 52, a plurality of FEMs 53-N, a plurality of antennas 54-N, a sensor hub 56, and at least one sensor 57.

The BP 51 may be a baseband modem, a CP, or the like. The BP 51 is a semiconductor for enabling voice communication and data communication, and may compress or decompress voice data and video data. The BP 51 may control and manage the user device 10 by integrating individual semiconductors such as a memory, a processor, a software entity, or the like. The BP 51 may use at least one of a GSM network, an EDGE network, a CDMA network, an OFDMA network, a W-CDMA network, an EV-DO network, an HSDPA network, an LTE network, a Wi-Fi network, a WiMax network, a GPS network, a Bluetooth network, and an NFC network.

The RFIC 52 may perform an RF function for connecting the plurality of antennas 54-N and a system semiconductor (e.g., the BP 51). The RFIC 52 may be an RF Tx/Rx chip (e.g., an RF transceiver). When receiving a radio signal, the RFIC 52 may receive the radio signal from the at least one antenna 54-N, may convert the received radio signal into a baseband signal, and may transmit the converted baseband signal to the BP 51. The BP 51 may process the received baseband signal, and may control a human/machine interface of the user device 10 corresponding to the received baseband signal. When transmitting the radio signal, the BP 51 may generate a baseband signal and output the signal to the RFIC 52. The RFIC 52 may receive the baseband signal from the BP 51, may convert the received baseband signal into a radio signal, and may transmit the signal to the air through the at least one antenna 54-N.

The plurality of FEMs 53-N may be a Tx/Rx device capable of controlling a radio-wave signal. The plurality of FEMs 53-N may be connected respectively to the plurality of antennas 54-N. The FEMs 53-N may connect the plurality of antennas 54-N and the RFIC 52, and may separate Tx/Rx signals. The FEM 53 may play a role of filtering and amplifying, and may include an Rx FEM having a filter to perform filtering on an Rx signal and a Tx FEM having a PAM to amplify a Tx signal.

The plurality of antennas 54-N may include a mono-pole antenna, a dipole antenna, an IFA, a PIFA, a slot antenna, or the like. The plurality of antennas 54-N may be mounted on a PCB as a thin plate (e.g., a micro strip), or may be fixed to an injected material (e.g., a carrier) attached to the PCB. The plurality of antennas 54-N may be fixed to an inner surface of a housing for forming an exterior of the user device 10. The plurality of antennas 54-N may be at least one metal body (e.g., a metal boundary) for forming the exterior of the user device 10.

The sensor hub 56 may be an MCU for performing a specific operation in response to information from the at least one sensor 57 independent of the BP 51. The sensor hub 56 may perform a specific operation sequence in response to at least one output (e.g., sensing value) from the at least one sensor 57 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). For example, the sensor hub 56 may determine weights for Rx signals and/or Tx signals through the plurality of antennas 54-N used in a structure of SIMO, MISO, diversity, or MIMO in response to at least one surrounding situation information from the at least one sensor 57. The RFIC 52 may combine the Rx signals from the plurality of antennas 54-N by applying the weights determined by the sensor hub 56. The RFIC 52 may apply the weights determined by the sensor hub 56 respectively to the Tx signals output from the plurality of antennas 54-N.

The at least one sensor 57 may include the gesture sensor, the acceleration sensor, the gyro sensor, the magnetic sensor, the grip sensor, the proximity sensor, the RGB sensor, the bio sensor, the pressure sensor, the temperature/humidity sensor, the illumination sensor, the UV sensor, or the like. The at least one sensor 57 may include a sensor for measuring an RSSI for the plurality of antennas 54-N. The at least one sensor 57 may include a sensor for measuring an SAR for the plurality of antennas 54-N.

The plurality of antennas 54-N may be used as a sensing medium for the at least one sensor 57 by being electrically connected to the at least one sensor 57 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). The at least one sensor 57 may acquire surrounding situation information (e.g., a movement of a hand, a movement of a user device, a grip of the user device, an object access to the user device, temperature, humidity, pressure, or the like) by using the plurality of antennas 54-N.

Figure 6:
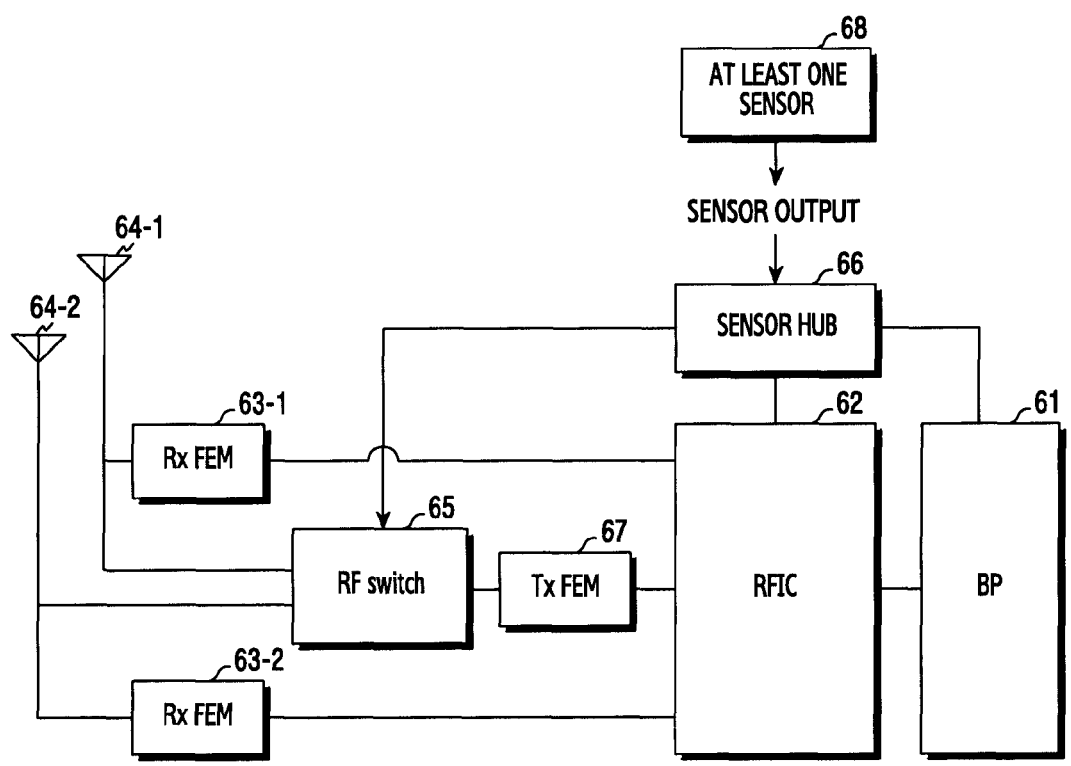
FIG. 6 is a block diagram of a wireless communication device having a structure of Reception (Rx) diversity or Multiple Input Multiple Output (MIMO) according to another exemplary embodiment of the present disclosure.

FIG. 6 is a block diagram of a wireless communication device having a structure of Rx diversity or MIMO according to another exemplary embodiment of the present disclosure.

Referring to FIG. 6, the wireless communication device may include a BP 61, an RFIC 62, Rx FEMs 63-1 and 63-2, antennas 64-1 and 64-2, an RF switch 65, a sensor hub 66, a Tx FEM 67, and at least one sensor 68.

The BP 61 may be a baseband modem, a CP, or the like. The BP 61 is a semiconductor for enabling voice communication and data communication, and may compress or decompress voice data and video data. The BP 61 may control and manage the user device 10 by integrating individual semiconductors such as a memory, a processor, a software entity, or the like. The BP 61 may use at least one of a GSM network, an EDGE network, a CDMA network, an OFDMA network, a W-CDMA network, an EV-DO network, an HSDPA network, an LTE network, a Wi-Fi network, a WiMax network, a GPS network, a Bluetooth network, and an NFC network.

The RFIC 62 may perform an RF function for connecting the plurality of antennas 64-N and a system semiconductor (e.g., the BP 61). The RFIC 62 may be an RF Tx/Rx chip (e.g., an RF transceiver). When receiving a radio signal, the RFIC 62 may receive the radio signal from the at least one antenna 64-N, may convert the received radio signal into a baseband signal, and may transmit the converted baseband signal to the BP 61. The BP 61 may process the received baseband signal, and may control a human/machine interface of the user device 10 corresponding to the received baseband signal. When transmitting the radio signal, the BP 61 may generate a baseband signal and output the signal to the RFIC 62. The RFIC 62 may receive the baseband signal from the BP 61, may convert the received baseband signal into a radio signal, and may transmit the signal to the air through the at least one antenna 64-N.

The Rx FEMs 63-1 and 63-2 may provide an electrical connection between the antennas 64-1 and 64-2 and the RFIC 62. The Rx FEMs 63-1 and 63-2 may have a filter to perform filtering on Rx signals from the antennas 64-1 and 64-2.

The antennas 64-1 and 64-2 may include a mono-pole antenna, a dipole antenna, an IFA, a PIFA, a slot antenna, or the like. The antennas 64-1 and 64-2 may be mounted on a PCB as a thin plate (e.g., a micro strip), or may be fixed to an injected material (e.g., a carrier) attached to the PCB. The antennas 64-1 and 64-2 may be fixed to an inner surface of a housing for forming an exterior of the user device 10. The antennas 64-1 and 64-2 may be at least one metal body (e.g., a metal boundary) for forming the exterior of the user device 10.

The RF switch 65 may provide an electrical connection between the antennas 64-1 and 64-2 and the Tx FEM 67. The RF switch 65 may selectively connect the specific antenna 64-1 or 64-2 to the Tx FEM 67 in a structure of Rx diversity or MIMO under the control of the sensor hub 56.

The Tx FEM 67 may provide an electrical connection between the RF switch 65 and the RFIC 62. The Tx FEM 67 may include a PAM for amplifying a Tx signal.

The sensor hub 66 may be an MCU for performing a specific operation in response to information from the at least one sensor 68 independent of the BP 61. The sensor hub 66 may perform a specific operation sequence in response to at least one output (e.g., sensing value) from the at least one sensor (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). For example, the sensor hub 66 may output to the RF switch 65 in association with a grip position and/or grip amount of a user of the user device 10 in response to at least one surrounding situation information from the at least one sensor 68. The sensor hub 66 may determine weights for Rx signals through the antennas 64-1 and 64-2 used in a structure of Rx diversity or MIMO in response to at least one surrounding situation information from the at least one sensor 68. The RFIC 62 may apply the weights determined by the sensor hub 66 respectively to the Rx signals from the antennas 64-1 and 64-2.

The at least one sensor 68 may include the gesture sensor, the acceleration sensor, the gyro sensor, the magnetic sensor, the grip sensor, the proximity sensor, the RGB sensor, the bio sensor, the pressure sensor, the temperature/humidity sensor, the illumination sensor, the UV sensor, or the like. The at least one sensor 68 may include a sensor for measuring Rx electric field strength for the antennas 64-1 and 64-2. The sensor hub 66 may include a sensor for measuring an SAR for the antennas 64-1 and 64-2.

The antennas 64-1 and 64-2 may be used as a sensing medium for the at least one sensor 68 by being electrically connected to the at least one sensor 68 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). The at least one sensor 68 may acquire surrounding situation information (e.g., a movement of a hand, a movement of a user device, a grip of the user device, an object access to the user device, temperature, humidity, pressure, or the like) by using the antennas 64-1 and 64-2.

Figure 7:
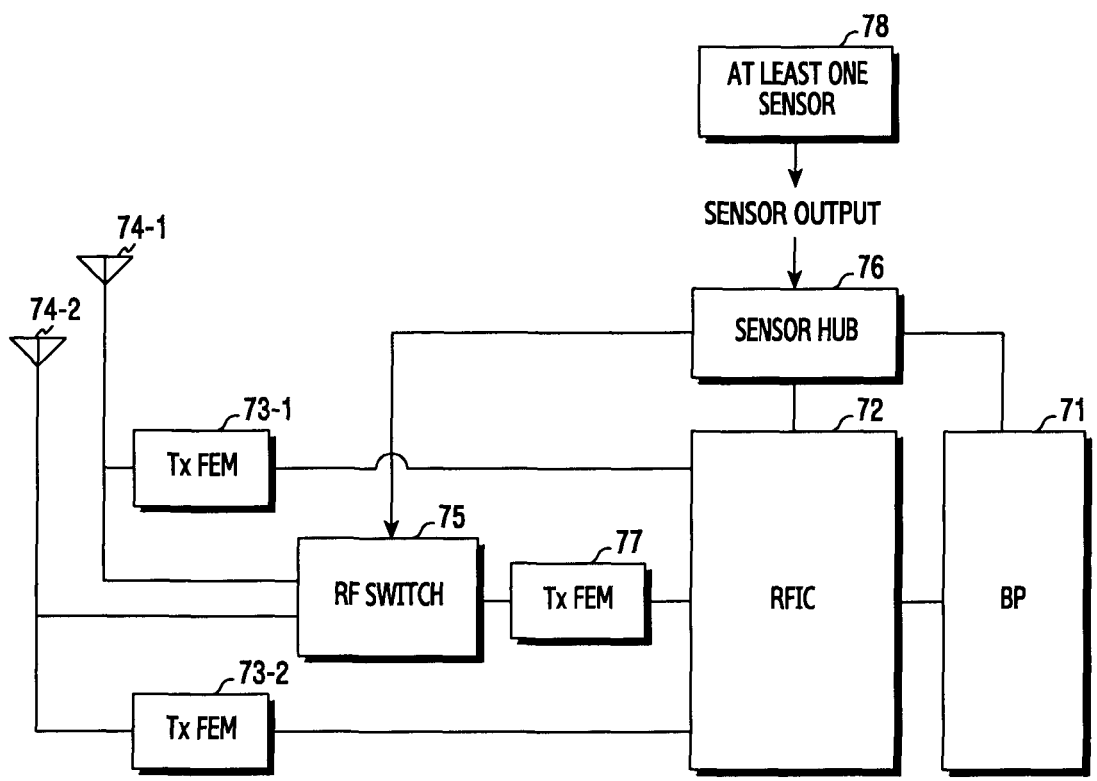
FIG. 7 is a block diagram of a wireless communication device having a structure of Transmission (Tx) diversity or MIMO according to another exemplary embodiment of the present disclosure.

FIG. 7 is a block diagram of a wireless communication device having a structure of Tx diversity or MIMO according to another exemplary embodiment of the present disclosure.

Referring to FIG. 7, the wireless communication device may include a BP 71, an RFIC 72, Tx FEMs 73-1 and 73-2, antennas 74-1 and 74-2, an RF switch 75, a sensor hub 76, an Rx FEM 77, and at least one sensor 78.

The BP 71 may be a baseband modem, a CP, or the like. The BP 71 is a semiconductor for enabling voice communication and data communication, and may compress or decompress voice data and video data. The BP 71 may control and manage the user device 10 by integrating individual semiconductors such as a memory, a processor, a software entity, or the like. The BP 71 may use at least one of a GSM network, an EDGE network, a CDMA network, an OFDMA network, a W-CDMA network, an EV-DO network, an HSDPA network, an LTE network, a Wi-Fi network, a WiMax network, a GPS network, a Bluetooth network, and an NFC network.

The RFIC 72 may perform an RF function for connecting the plurality of antennas 74-N and a system semiconductor (e.g., the BP 71). The RFIC 72 may be an RF Tx/Rx chip (e.g., an RF transceiver). When receiving a radio signal, the RFIC 72 may receive the radio signal from the at least one antenna 74-N, may convert the received radio signal into a baseband signal, and may transmit the converted baseband signal to the BP 71. The BP 71 may process the received baseband signal, and may control a human/machine interface of the user device 10 corresponding to the received baseband signal. When transmitting the radio signal, the BP 71 may generate a baseband signal and output the signal to the RFIC 72. The RFIC 72 may receive the baseband signal from the BP 71, may convert the received baseband signal into a radio signal, and may transmit the signal to the air through the at least one antenna 74-N.

The Tx FEMs 73-1 and 73-2 may provide an electrical connection between the antennas 74-1 and 74-2 and the RFIC 72. The Tx FEMs 73-1 and 73-2 may include a PAM for amplifying a Tx signal.

The antennas 74-1 and 74-2 may include a mono-pole antenna, a dipole antenna, an IFA, a PIFA, a slot antenna, or the like. The antennas 74-1 and 74-2 may be mounted on a PCB as a thin plate (e.g., a micro strip), or may be fixed to an injected material (e.g., a carrier) attached to the PCB. The antennas 74-1 and 74-2 may be fixed to an inner surface of a housing for forming an exterior of the user device 10. The antennas 74-1 and 74-2 may be at least one metal body (e.g., a metal boundary) for forming the exterior of the user device 10.

The RF switch 75 may provide an electrical connection between the antennas 74-1 and 74-2 and the Rx FEM 77. The RF switch 75 may selectively connect the specific antenna 74-1 or 74-2 to the Rx FEM 77 in a structure of Tx diversity or MIMO under the control of the sensor hub 56.

The Rx FEM 77 may provide an electrical connection between the RF switch 75 and the RFIC 72. The Rx FEM 77 may have a filter to perform filtering on Rx signals from the antennas 74-1 and 74-2.

The sensor hub 76 may be an MCU for performing a specific operation in response to information from the at least one sensor 78 independent of the BP 71. The sensor hub 76 may perform a specific operation sequence in response to at least one output (e.g., sensing value) from the at least one sensor (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). For example, the sensor hub 76 may output to the RF switch 75 in association with a grip position and/or grip amount of a user of the user device 10 in response to at least one surrounding situation information from the at least one sensor 78. The sensor hub 76 may determine weights for Tx signals through the plurality of antennas 74-1 and 74-2 used in a structure of Tx diversity or MIMO in response to at least one surrounding situation information from the at least one sensor 78. The RFIC 72 may apply the weights determined by the sensor hub 76 respectively to the Tx signals from the plurality of antennas 74-1 and 74-2.

The at least one sensor 78 may include the gesture sensor, the acceleration sensor, the gyro sensor, the magnetic sensor, the grip sensor, the proximity sensor, the RGB sensor, the bio sensor, the pressure sensor, the temperature/humidity sensor, the illumination sensor, the UV sensor, or the like. The at least one sensor 78 may include a sensor for measuring Rx electric field strength for the antennas 74-1 and 74-2. The sensor hub 76 may include a sensor for measuring an SAR for the antennas 74-1 and 74-2.

The antennas 74-1 and 74-2 may be used as a sensing medium for the at least one sensor 78 by being electrically connected to the at least one sensor 78 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). The at least one sensor 78 may acquire surrounding situation information (e.g., a movement of a hand, a movement of a user device, a grip of the user device, an object access to the user device, temperature, humidity, pressure, or the like) by using the antennas 74-1 and 74-2.

Figure 8:
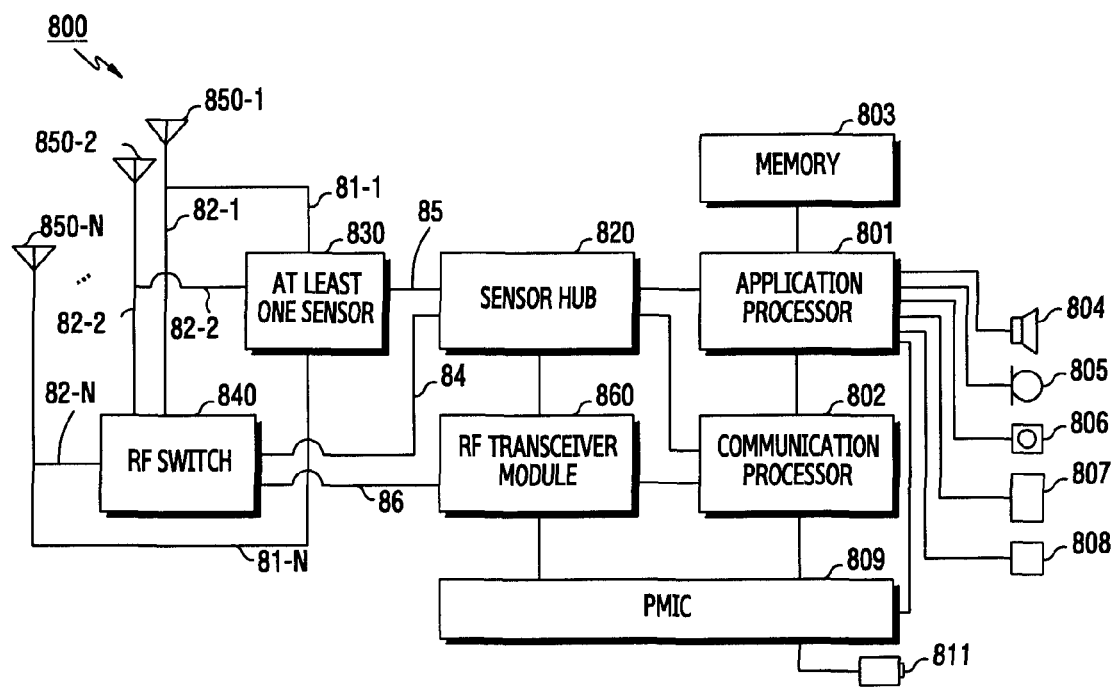
FIG. 8 is a block diagram of a user device according to another exemplary embodiment of the present disclosure.

FIG. 8 is a block diagram of a user device according to another exemplary embodiment of the present disclosure.

A user device 800 may be a device such as a mobile phone, a mobile pad, a media player, a tablet computer, a handheld computer, or a Personal Digital Assistant (PDA). The user device 800 may be any electronic device including a device having two or more combined functions of the aforementioned devices.

Referring to FIG. 8, the user device 800 may include an Application Processor (AP) 801, a Communication Processor (CP) 802, a memory 803, a speaker 804, a microphone 805, a camera 806, a display 807, a touch panel 808, a Power Manager Integrated Circuit (PMIC) 809, a battery 811, a sensor hub 820, at least one sensor 830, an RF switch 840, a plurality of antennas 850-N, and an RF transceiver module 860.

The AP 801 plays a role of a brain of the user device 800, and may support an arithmetic processing function, a content reproduction function of various formats (e.g., an audio, image, video, or the like), a graphic engine, or the like. The AP 801 may drive an Operating System (OS), various functions, or the like, applied to the user device 800. The AP 801 may be constructed with one chip on which a great number of functions are integrated. The functions may be a core, a memory, a display system/controller, a multimedia encoding/decoding codec, a 2 Dimensional (D)/3D accelerator engine, an Image Signal Processor (ISP), a camera, an audio modem, a variety of high & low speed serial/parallel connectivity interface, or the like. The AP 801 drives the OS and applications, and may be called a System-On-Chip (SOC) on which a function of controlling various system devices/interfaces is integrated into one chip.

The CP 802 enables voice communication and/or data communication, and may compress voice data and image data or may decompress the compressed data. The CP 802 may be a baseband modem, a Baseband Processor (BP), or the like. The CP 802 may be designed to operate by using one of a GSM network, an EDGE network, a CDMA network, a W-CDMA network, an LTE network, an OFDMA network, a Wi-Fi network, a WiMax network, a Bluetooth network, and an NFC network.

Although not shown, the user device 800 may include a graphic processor or an audio processor. The graphic processor processes a graphic-related operation, and may serve for image information processing, acceleration, signal conversion, screen output, or the like. The graphic processor may solve a bottleneck phenomenon generated due to a graphic task of the AP 801, and may perform 2D or 3D graphic processing faster than the AP 801. The audio processor processes an audio-related operation, and may change an audio signal having a digital or analog format by using an audio effect or an effect unit.

The memory 803 may store a software-related program (i.e., an instruction set) executable by the aforementioned processors. The memory 803 may include a fast random access memory such as one or more magnetic disc storage devices and/or a non-volatile memory, one or more optical storage devices, and/or a flash memory (e.g., NAND, NOR). A software component may include an operating system program, a communication program, a camera program, a graphic program, one or more application programs, a user interface program, a codec program, or the like. The terminology of "program" is also expressed as a set of instructions or an instruction set or a program. The communication program, the camera program, the graphic program, the one or more application programs, the user interface program, and the codec program may be used through various Application Programming Interfaces (APIs) when the operating system program performs various functions. In addition to the aforementioned programs, the memory 803 may further include an additional program (instructions).

The speaker 804 may convert an electric signal into a sound of an audible frequency band and then may output the converted signal. The microphone 805 may convert a sound wave delivered from human or other sound sources into an electric signal.

The camera 806 may convert a light beam reflected from a subject of photography into an electric signal. The camera 806 may include a Charged Coupled Device (CCD), a Complementary Metal-Oxide Semiconductor (CMOS), or the like.

The display 807 may output an electric signal as visual information (e.g., text, graphic, video, or the like). The display 807 may be one of an Electro Wetting Display (EWD), an E-Paper, a Plasma Display Panel (PDP), a Liquid Crystal Display (LCD), an Organic Light Emitting Diode (OLED), and an Active Matrix Organic Light Emitting Diodes (AMOLED).

The touch panel 808 may receive a touch input. The touch panel may be one of a digitizer for a stylus pen, a capacitive overlap touch panel, a resistance overlap touch panel, a surface acoustic wave touch panel, and an infrared beam touch panel.

The PMIC 809 may regulate a power from the battery 811. For example, the AP 801 may transmit information to the PMIC 809 with a load to be processed. The PMIC 809 may regulate a core voltage to be supplied to the AP 801 by using the information provided from the AP 801, and may drive the AP 801 always with a minimum power.

The sensor hub 820 may be an MCU for performing a specific operation in response to information from at last one sensor 830 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like) independent of the AP 801 and/or the CP 802. The sensor hub 820 may contribute to decrease a work load of the AP 801 and/or the CP 802 and to decrease power consumption. The sensor hub 820 may be managed and controlled by the AP 801 and/or the CP 802.

The plurality of antennas 850-N may include a mono-pole antenna, a dipole antenna, an IFA, a PIFA, a slot antenna, or the like. The plurality of antennas 850-N may be mounted on a PCB as a thin plate (e.g., a micro strip), or may be fixed to an injected material (e.g., a carrier) attached to the PCB. The plurality of antennas 850-N may be fixed to an inner surface of a housing for forming an exterior of the user device 10. The plurality of antennas 850-N may be at least one metal body (e.g., a metal boundary) for forming the exterior of the user device 10. As shown in FIG. 1, the plurality of antennas 850-N may be installed to at least one portion among an upper portion U, a lower portion D, a left end portion L, a right end portion R, and a rear portion (not shown) of the user device 10 (see FIGS. 1 and 2).

The plurality of antennas 850-N may be used as a sensing medium for the at least one sensor 830 by being electrically connected to the at least one sensor 830 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). The at least one sensor 830 may be provided plural in number in association with the plurality of antennas 850-N. The sensor hub 820 may output a control signal through a connection path 84 with the RF switch 840 in response to an output from the at least one sensor 830. In at least one structure among SISO, SIMO, MISO, diversity, and MIMO, the sensor hub 820 may select the at least one antenna 850-N used in a Tx path and/or Rx path 86 of the RF transceiver module 860 by controlling the RF switch 840 in response to the output from the at least one sensor 830. For example, the sensor hub 820 may acquire a capacitance change amount of the plurality of antennas 850-N from the at least one sensor 830, and may evaluate a grip amount at a portion (e.g., an upper portion or lower portion of the user device) at which the plurality of antennas 850-N are installed. The capacitance change amount of the antenna may be in proportion to the grip amount. As shown in FIG. 2, when the user grips a lower portion (indicated by D of FIG. 1) of the user device 800, an antenna of the lower portion D has a capacitance change, whereas an antenna of an upper portion (indicated by U of FIG. 1) may have no capacitance change or may have a relatively less significant than the capacitance change of the antenna of the lower portion D. The sensor hub 820 may evaluate the grip amount of the user as to a portion at which the plurality of antennas 850-N are disposed in response to the capacitance change amount of the plurality of antennas 850-N. The sensor hub 820 may selectively use the plurality of antennas 850-N under the control of the RF switch 840 by considering the grip amount, or may apply a weight for each Rx and/or Tx signal through the plurality of antennas 850-N in a structure of SIMO, MISO, diversity, or MIMO by considering the grip amount. When the grip amount of the user is great at a place where the antenna is disposed, antenna radiation performance may deteriorate more easily. An antenna having a small grip amount of the user may be preferable in radiation.

The sensor hub 820 may regulate Tx power supplied to the at least one antenna 850-N in response to an output from the at least one sensor 830 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). For example, when the user brings a receiver of the user device 800 for telephony, capacitance of the antenna disposed nearby the receiver may vary due to a face of the user. The grip sensor may provide a capacitance change of the antenna 850-N nearby the receiver to the sensor hub 820 through the connection path 85 with respect to the sensor hub 820. The sensor hub 820 may control the RF transceiver module 860 to back off Tx power supplied to the antenna 850-N, thereby being able to decrease an SAR.

The RF switch 840 may select a connection path 82-N with respect to the at least one antenna 850-N to be connected to the connection path 86 with respect to the RF transceiver module 860 in response to a control signal from the sensor hub 820.

The RF transceiver module 860 may include all RF components between the antennas 850-N and the CP 802. The RF transceiver module 860 may include an RFIC, an FEM, or the like. The RFIC (e.g., the RF transceiver) may perform an RF function for connecting a plurality of antennas and a system semiconductor (e.g., a modem). The FEM may be a Tx/Rx device capable of controlling a radio-wave signal. The FEM may connect the antenna and the RFIC, and may separate Tx/Rx signals. The FEM may play a role of filtering and amplifying, and may include an Rx FEM having a filter to perform filtering on an Rx signal and a Tx FEM having a PAM to amplify a Tx signal. When receiving a radio signal, the RF transceiver module 860 may receive the radio signal from the at least one antenna 850-N, may convert the received radio signal into a baseband signal, and may transmit the converted baseband signal to the CP 802. The CP 802 may process the received baseband signal, and may control a human/machine interface of the user device 10 corresponding to the received baseband signal. When transmitting the radio signal, the CP 802 may generate a baseband signal and output the signal to the RF transceiver module 860. The RF transceiver module 860 may receive the baseband signal from the CP 802, may convert the received baseband signal into a radio signal, and may transmit the signal to the air through the at least one antenna 850-N.

Figure 9:
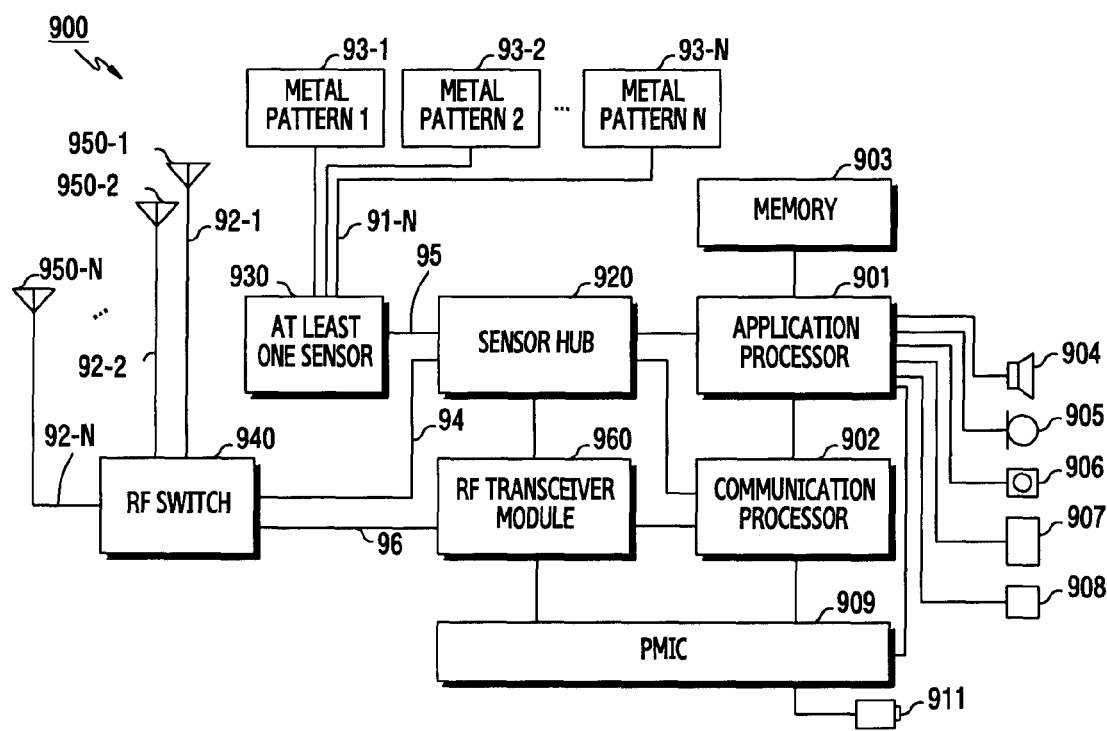
FIG. 9 is a block diagram of a user device according to another exemplary embodiment of the present disclosure.

FIG. 9 is a block diagram of a user device according to another exemplary embodiment of the present disclosure.

Referring to FIG. 9, a user device 900 may include an AP 901, a CP 902, a memory 903, a speaker 904, a microphone 905, a camera 906, a display 907, a touch panel 908, a PMIC 909, a battery 911, a sensor hub 920, at least one sensor 930, a plurality of metal patterns 93-N, an RF switch 940, a plurality of antennas 950-N, and an RF transceiver module 960.

The AP 901 plays a role of a brain of the user device 900, and may support an arithmetic processing function, a content reproduction function of various formats (e.g., an audio, image, video, or the like), a graphic engine, or the like. The AP 901 may drive an OS, various functions, or the like, applied to the user device 900. The AP 901 may be constructed with one chip on which a great number of functions are integrated. The functions may be a core, a memory, a display system/controller, a multimedia encoding/decoding codec, a 2D/3D accelerator engine, an ISP, a camera, an audio modem, a variety of high & low speed serial/parallel connectivity interface, or the like. The AP 901 drives the OS and applications, and may be called an SOC on which a function of controlling various system devices/interfaces is integrated into one chip.

The CP 902 enables voice communication and/or data communication, and may compress voice data and image data or may decompress the compressed data. The CP 902 may be a baseband modem, a BP, or the like. The CP 902 may be designed to operate by using one of a GSM network, an EDGE network, a CDMA network, a W-CDMA network, an LTE network, an OFDMA network, a Wi-Fi network, a WiMax network, a Bluetooth network, and an NFC network.

The memory 903 may store a software-related program (i.e., an instruction set) executable by the aforementioned processors. The memory 903 may include a fast random access memory such as one or more magnetic disc storage devices and/or a non-volatile memory, one or more optical storage devices, and/or a flash memory (e.g., NAND, NOR). A software component may include an operating system program, a communication program, a camera program, a graphic program, one or more application programs, a user interface program, a codec program, or the like. The terminology of "program" is also expressed as a set of instructions or an instruction set or a program. The communication program, the camera program, the graphic program, the one or more application programs, the user interface program, and the codec program may be used through various APIs when the operating system program performs various functions. In addition to the aforementioned programs, the memory 903 may further include an additional program (instructions).

The speaker 904 may convert an electric signal into a sound of an audible frequency band and then may output the converted signal. The microphone 905 may convert a sound wave delivered from human or other sound sources into an electric signal.

The camera 906 may convert a light beam reflected from a subject of photography into an electric signal. The camera 906 may include a CCD, a CMOS, or the like.

The display 907 may output an electric signal as visual information (e.g., text, graphic, video, or the like). The display 907 may be one of an EWD, an E-Paper, a PDP, an LCD, an OLED, and an AMOLED.

The touch panel 908 may receive a touch input. The touch panel 908 may be one of a digitizer for a stylus pen, a capacitive overlap touch panel, a resistance overlap touch panel, a surface acoustic wave touch panel, and an infrared beam touch panel.

The PMIC 909 may regulate a power from the battery 911.

The sensor hub 920 may be an MCU for performing a specific operation in response to information from at last one sensor 930 (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like) independent of the AP 901 and/or the CP 902. The sensor hub 920 may contribute to decrease a work load of the AP 901 and/or the CP 902 and to decrease power consumption. The sensor hub 920 may be managed and controlled by the AP 901 and/or the CP 902.

The plurality of antennas 950-N may include a mono-pole antenna, a dipole antenna, an IFA, a PIFA, a slot antenna, or the like. The plurality of antennas 950-N may be mounted on a PCB as a thin plate (e.g., a micro strip), or may be fixed to an injected material (e.g., a carrier) attached to the PCB. The plurality of antennas 950-N may be fixed to an inner surface of a housing for forming an exterior of the user device 10. The plurality of antennas 950-N may be at least one metal body (e.g., a metal boundary) for forming the exterior of the user device 10. As shown in FIG. 1, the plurality of antennas 950-N may be installed to at least one portion among an upper portion U, a lower portion D, a left end portion L, a right end portion R, and a rear portion (not shown) of the user device 10 (see FIGS. 1 and 2).

The plurality of metal patterns 93-1 may be used as a sensing medium for the at least one sensor 930. The plurality of metal patterns 93-1 may be a conductive paint to be applied, a metal plate to be attached, or the like, and may be formed to an inner surface or outer surface of a housing for forming an exterior of the user device 900 or may be formed on a PCB.

The sensor hub 920 may output a control signal through a connection path 94 with the RF switch 940 in response to an output from the at least one sensor 930. In at least one structure among SISO, SIMO, MISO, diversity, and MIMO, the sensor hub 920 may select the at least one antenna 950-N used in a Tx path and/or Rx path 96 of the RF transceiver module 960 by controlling the RF switch 940 in response to the output from the at least one sensor 930. For example, the sensor hub 920 may acquire a capacitance change amount of the plurality of metal patterns 93-N disposed to different positions from the at least one sensor 930, and may evaluate a grip amount at a portion at which the plurality of antennas 950-N are installed. When a user grips the user device 900, a user's hand (or a sensing object) is brought into an electric field formed on the at least one metal pattern 93-N disposed to the gripped portion, and a portion of the electric field may be connected in a ground state. The at least one sensor 930 may sense a capacitance change depending on a change in the electric field. The at least one sensor 930 may sense a capacitance change of the plurality of patterns 93-N through the connection path 91-N with the plurality of metal patterns 93-N. The capacitance change of each metal pattern 93-N may vary depending on a portion at which the user grips the user device 900. The capacitance sensor 930 may output the capacitance change of the plurality of metal patterns 93-N through the connection path 95 with the sensor hub 920. The sensor hub 920 may selectively use the plurality of antennas 950-N under the control of the RF switch 940 by considering the grip amount, or may apply a weight for each Tx and/or Rx signal through the plurality of antennas 950-N in a structure of SIMO, MISO, diversity, or MIMO by considering the grip amount. When a grip amount of the user is great at a place where the antenna is disposed, the capacitance change amount of the at least one metal pattern 93-N may be increased, and antenna radiation performance may deteriorate relatively more easily. An antenna nearby the metal pattern 93-N having a small grip amount of the user may be preferable in radiation. The sensor hub 920 may regulate power supplied to the antenna 950-N in response to the capacitance change amount of the metal pattern 93-N. When the user brings a receiver of the user device 900 for telephony, capacitance of the metal pattern 93-N disposed nearby the receiver may vary due to a face of the user. The at least one sensor 930 may provide a capacitance change of the metal pattern 93-N nearby the receiver to the sensor hub 920. The sensor hub 920 may back off power supplied to the antenna 950-N, thereby being able to decrease an SAR.

The RF switch 940 may connect or not connect a connection path 92-N with respect to the at least one antenna 950-N or the connection path 96 with respect to the RF transceiver module 960 in response to a control signal from the sensor hub 920.

The RF transceiver module 960 may transmit/receive an RF signal through the at least one antenna 950-N according to the operation of the RF switch 940. The RF transceiver module 960 may include all RF components between the antennas 950-N and the CP 902. The RF transceiver module 960 may include an RFIC, an FEM, or the like. The RFIC (e.g., the RF transceiver) may perform an RF function for connecting signals through a plurality of antennas and a system semiconductor (e.g., a modem). The FEM may be a Tx/Rx device capable of controlling a radio-wave signal. The FEM may connect the antenna and the RFIC, and may separate Tx/Rx signals. The FEM may play a role of filtering and amplifying, and may include an Rx FEM having a filter to perform filtering on an Rx signal and a Tx FEM having a PAM to amplify a Tx signal. When receiving a radio signal, the RF transceiver module 960 may receive the radio signal from the at least one antenna 950-N, may convert the received radio signal into a baseband signal, and may transmit the converted baseband signal to the CP 902. The CP 902 may process the received baseband signal, and may control a human/machine interface of the user device 10 corresponding to the received baseband signal. When transmitting the radio signal, the CP 902 may generate a baseband signal and output the signal to the RF transceiver module 960. The RF transceiver module 960 may receive the baseband signal from the CP 902, may convert the received baseband signal into a radio signal, and may transmit the signal to the air through the at least one antenna 950-N.

Figure 10:
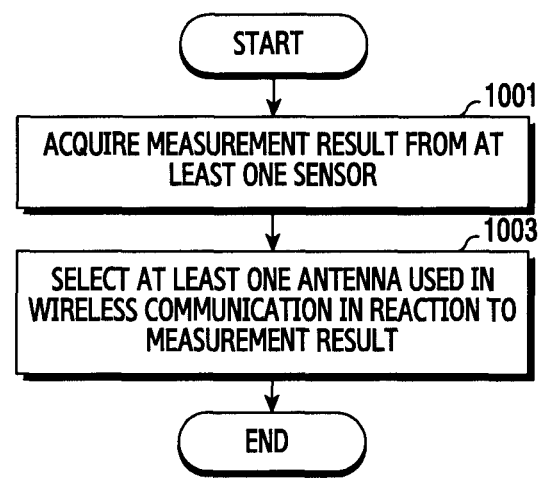
FIG. 10 is a flowchart illustrating a procedure of operating a sensor hub according to an exemplary embodiment of the present disclosure.

FIG. 10 is a flowchart illustrating a procedure of operating a sensor hub according to an exemplary embodiment of the present disclosure.

Referring to FIG. 10, in operation 1001, the sensor hubs 820 and 920 may acquire a measurement result from at least one sensor (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). In operation 1003, the sensor hubs 820 and 920 may select at least one antenna used in wireless communication (e.g., a structure in SISO, SIMO, MISO, diversity, or MIMO) in response to the measurement result. For example, the sensor hubs 820 and 920 may select at least one antenna having a relatively small capacitance change.

The sensor hubs 820 and 920 may select at least one antenna having a relatively high RSSI. The sensor hubs 820 and 920 may select at least one antenna having a relatively low SAR.

Figure 11:
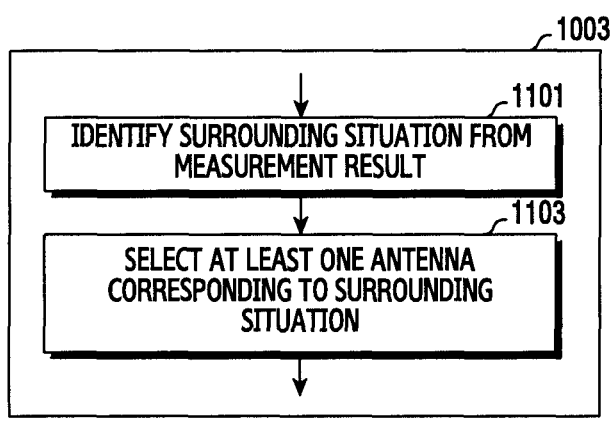
FIG. 11 is a flowchart of an operation 1003 of FIG. 10 according to various exemplary embodiments of the present disclosure.

FIG. 11 is a flowchart of the operation 1003 of FIG. 10 according to various exemplary embodiments of the present disclosure.

Referring to FIG. 11, in operation 1101, the sensor hubs 820 and 920 may recognize a surrounding situation from a measurement result acquired from at least one sensor (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). The surrounding situation may include at least one piece of information such as a movement of a user device, a grip of the user device, a grip position of the user device, a grip amount of the user device, an access of an object (e.g., a hand, a metal material) to the user device, temperature, humidity, pressure, or the like. In operation 1103, the hub sensors 820 and 920 may select at least one antenna corresponding to the surrounding situation.

Figure 12:
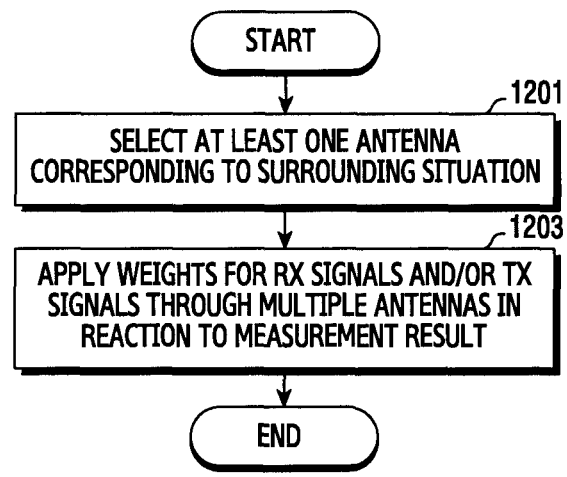
FIG. 12 is a flowchart illustrating a procedure of operating a sensor hub according to another exemplary embodiment of the present disclosure.

FIG. 12 is a flowchart illustrating a procedure of operating a sensor hub according to another exemplary embodiment of the present disclosure.

Referring to FIG. 12, in operation 1201, the sensor hubs 820 and 920 may acquire a measurement result from at least one sensor (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). In operation 1203, the sensor hubs 820 and 920 may apply weights for Rx signals and/or Tx signals through a plurality of antennas in response to the measurement result.

Figure 13:
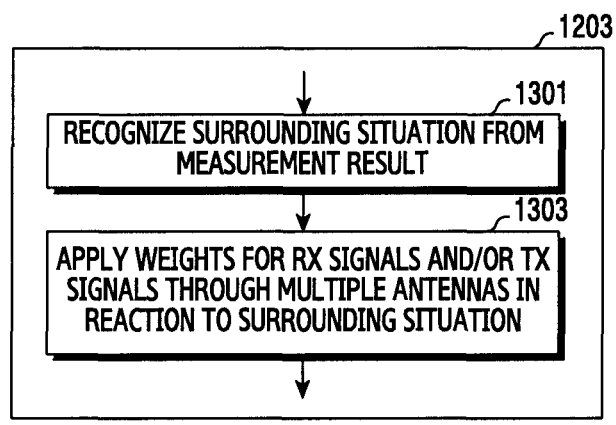
FIG. 13 is a flowchart of an operation 1203 of FIG. 12 according to various exemplary embodiments of the present disclosure.

FIG. 13 is a flowchart of the operation 1203 of FIG. 12 according to various exemplary embodiments of the present disclosure.

Referring to FIG. 13, in operation 1301, the sensor hubs 820 and 920 may recognize a surrounding situation from a measurement result. The surrounding situation may include at least one piece of information such as a movement of a user device, a grip of the user device, a grip position of the user device, a grip amount of the user device, an object access to the user device, temperature, humidity, pressure, or the like. In operation 1303, the sensor hubs 820 and 920 may apply weights for Rx signals and/or Tx signals through a plurality of antennas in response to the surrounding situation.

Figure 14:
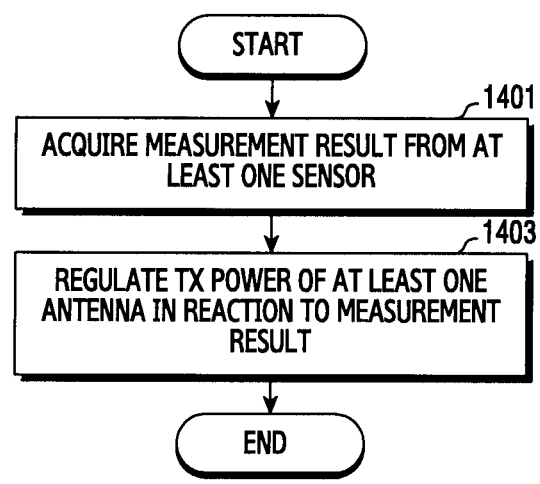
FIG. 14 is a flowchart illustrating a procedure of operating a sensor hub according to another exemplary embodiment of the present disclosure.

FIG. 14 is a flowchart illustrating a procedure of operating a sensor hub according to another exemplary embodiment of the present disclosure.

Referring to FIG. 14, in operation 1401, the sensor hubs 820 and 920 may acquire a measurement result from at least one sensor (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like). In operation 1403, the sensor hubs 820 and 920 may regulate Tx power of at least one antenna in response to the measurement result.

Figure 15:
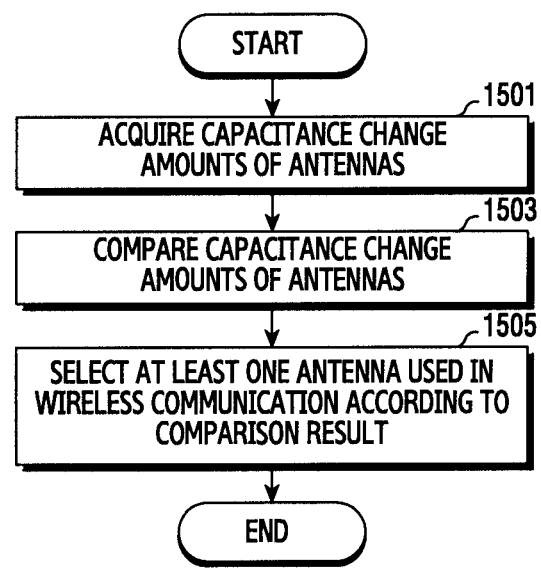
FIG. 15 is a flowchart illustrating a procedure of operating a sensor hub according to another exemplary embodiment of the present disclosure.

FIG. 15 is a flowchart illustrating a procedure of operating a sensor hub according to another exemplary embodiment of the present disclosure.

Referring to FIG. 15, in operation 1501, the sensor hubs 820 and 920 may acquire capacitance change amounts of antennas. In operation 1503, the sensor hubs 820 and 920 may compare the capacitance change amounts of the antennas. In operation 1505, the sensor hubs 820 and 920 may select at least one antenna used in wireless communication according to the comparison result. For example, the sensor hubs 820 and 920 may select at least one antenna having a relatively small capacitance change amount.

Figure 16:
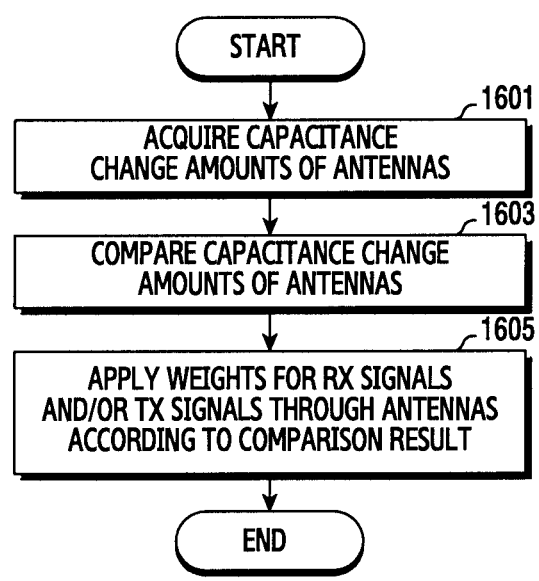
FIG. 16 is a flowchart illustrating a procedure of operating a sensor hub according to another exemplary embodiment of the present disclosure.

FIG. 16 is a flowchart illustrating a procedure of operating a sensor hub according to another exemplary embodiment of the present disclosure.

Referring to FIG. 16, in operation 1601, the sensor hubs 820 and 920 may acquire capacitance change amounts of antennas 1150-N. In operation 1603, the sensor hubs 820 and 920 may compare the capacitance change amounts of the antennas 1150-N. In operation 1605, the sensor hubs 820 and 920 may apply weights for Rx signals and/or Tx signals through the antennas according to the comparison result. For example, if a capacitance change amount of a first antenna is greater than a capacitance change amount of a second antenna, the sensor hubs 820 and 920 may increase the weight of the Rx signal and/or Tx signal through the second antenna instead of the weight of the Rx signal and/or Tx signal through the first antenna. If the capacitance change amount of the first antenna is smaller than the capacitance change amount of the second antenna, the sensor hubs 820 and 920 may increase the weight of the Rx signal and/or Tx signal through the first antenna instead of the weight of the Rx signal and/or Tx signal through the second antenna. If the capacitance change amount of the first antenna is equal to the capacitance change amount of the second antenna, the sensor hubs 820 and 920 may apply the same weight to the Rx signal and/or Tx signal through the first antenna and the Rx signal and/or Tx signal through the second antenna. The RF transceiver modules 860 and 960 may combine the Rx signals from the antennas 850-N and 950-N by applying the weights determined by the sensor hubs 820 and 920. The RF transceiver modules 860 and 960 may apply the weights determined by the sensor hubs 820 and 920 respectively to the Tx signals output from the antennas 850-N and 950-N.

Figure 17:
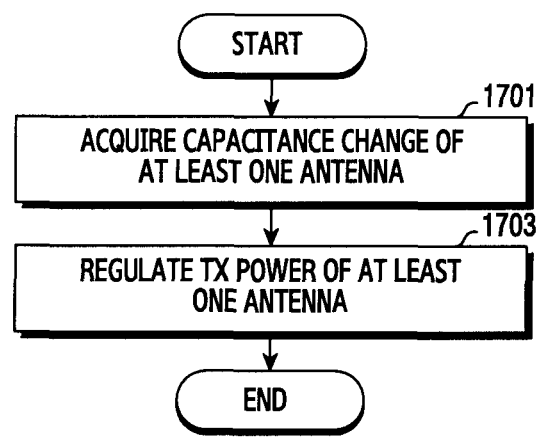
FIG. 17 is a flowchart illustrating a procedure of operating a sensor hub according to various exemplary embodiments of the present disclosure.

FIG. 17 is a flowchart illustrating a procedure of operating a sensor hub according to various exemplary embodiments of the present disclosure.

Referring to FIG. 17, in operation 1701, the sensor hubs 820 and 920 may acquire a capacitance change of at least one antenna. In operation 1703, the sensor hubs 820 and 920 may regulate Tx power of the at least one antenna in response to the capacitance change of the at least one antenna. For example, when the user brings a receiver of the user device 10 for telephony, capacitance of the antenna disposed nearby the receiver may vary due to a face of the user. The at least one sensor may provide a capacitance change of the antennas 850-N and 950-N nearby the receiver to the sensor hubs 820 and 920. The sensor hubs 820 and 920 may back off Tx power supplied to the antennas 850-N and 950-N, thereby being able to decrease an SAR.

Figure 18:
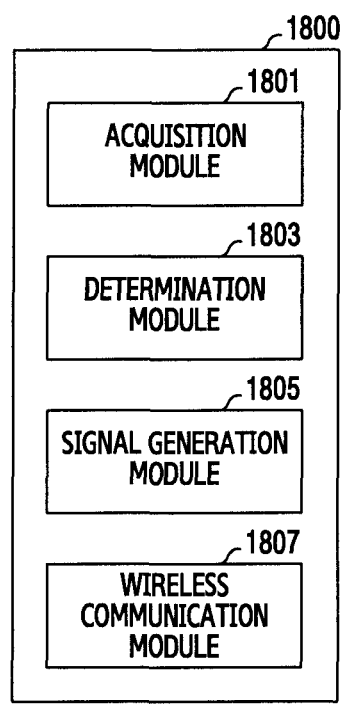
FIG. 18 is a block diagram of an electronic device according to various exemplary embodiments of the present disclosure.

FIG. 18 is a block diagram of an electronic device according to various exemplary embodiments of the present disclosure.

Referring to FIG. 18, an electronic device 1800 may include an acquisition module 1801, a determination module 1830, a signal generation module 1805, and a wireless communication module 1807.

The acquisition module 1801 (e.g., the sensor hub 820 or 920) may acquire information from at least one sensor (e.g., a gesture sensor, an acceleration sensor, a gyro sensor, a magnetic sensor, a grip sensor, a proximity sensor, an RGB sensor, a bio sensor, a pressure sensor, a temperature/humidity sensor, an illumination sensor, a UV sensor, or the like).

The determination module 1803 may identify a surrounding environment from the information acquired from the acquisition module 1801. The surrounding environment may include a grip of a user device, a grip position of the user device, an object access to the user device, an inside or outside of a building, an alpine zone, weather, or the like.

The signal generation module 1805 (e.g., the sensor hub 820 or 920) may generate a control signal corresponding to the surrounding environment identified by the determination module 1803.

The wireless communication module 1807 may perform wireless communication through an operation in response to the control signal from the signal generation module 1805. The wireless communication module 1807 may select at least one antenna used in the wireless communication in response to the control signal. The wireless communication module 1807 may determine a weight for an Rx signal and/or a Tx signal through an antenna in response to the control signal. The wireless communication module 1807 may determine a wireless communication scheme (e.g., SISO, SIMO, MISO, diversity, or MIMO) in response to the control signal.

Figure 19:
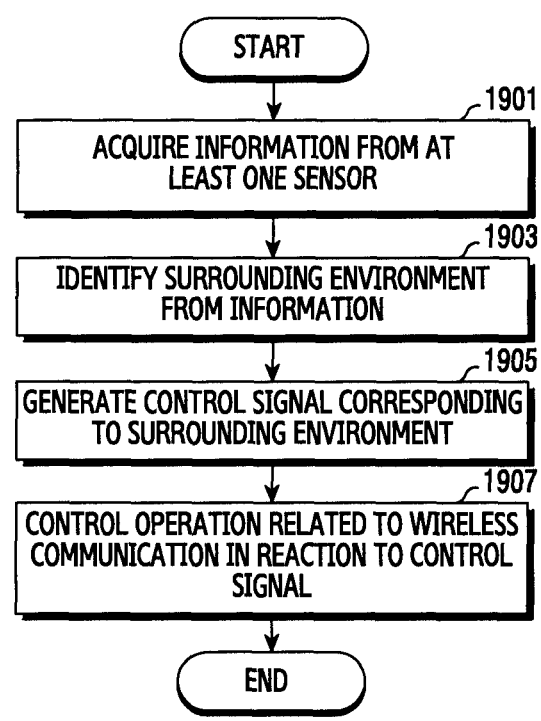
FIG. 19 is a flowchart illustrating a procedure of operating an electronic device according to various exemplary embodiments of the present disclosure.

FIG. 19 is a flowchart illustrating a procedure of operating an electronic device according to various exemplary embodiments of the present disclosure.

Referring to FIG. 19, in operation 1901, a module (e.g., the acquisition module 1801) may acquire information from at least one sensor.

In operation 1903, a module (e.g., the determination module 1803) may identify a surrounding environment from the acquired information.

In operation 1905, a module (e.g., the signal generation module 1805) may generate a control signal corresponding to the identified surrounding environment.

In operation 1907, a module (e.g., the wireless communication module 1807) may control an operation related to wireless communication in response to the control signal.

According to various exemplary embodiments of the present disclosure, each of modules may be configured with a software component, a firmware component, a hardware component, or a combination thereof. In addition, some or all modules may be configured as one entity, and a function of each module may be identically performed. According to various exemplary embodiments of the present disclosure, each of operations may be executed in sequence, repetition, or parallel. In addition, some operations may be omitted, or may be executed by adding other operations. For example, each of operations may be executed by a corresponding module described in the present disclosure.

Methods based on the embodiments disclosed in the claims or specification of the present disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have an access to an electronic device through an external port.

In addition, an additional storage device on a communication network may have an access to a portable electronic device.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed description thereof but by the appended claims, and all differences within equivalents of the scope will be construed as being included in the present disclosure.

The invention claimed is:

1. An electronic device comprising:
    a plurality of antennas configured to transmit and receive radio waves;
    at least one sensor configured to sensing a physical quantity or physical changes, wherein the physical quantity or physical changes include a Received Signal Strength Indication (RSSI) for the plurality of antennas;
    a sensor hub configured to output at least one control signal in response to an output from the at least one sensor; and
    Radio Frequency (RF) components configured to control wireless communication using the plurality of antennas in response to the at least one control signal,
    wherein the sensor hub is configured to output the at least one control signal for increasing a weight for a Receive (Rx) signal and/or a Transmit (Tx) signals through an antenna of which the RSSI is relatively high, and output the at least one control signal for decreasing the weight for the Rx signal and/or the Tx signal through an antenna of which the RSSI is relatively low, and
    wherein the RF components are configured to apply weights for (Rx) signals and/or (Tx) signals through the plurality of antennas in response to the at least one control signal.

2. The electronic device of claim 1, wherein the RF components are further configured to select at least one antenna used in the wireless communication among the plurality of antennas in response to the at least one control signal.

3. The electronic device of claim 2,
    wherein the physical quantity or physical changes further include a capacitance change regarding the plurality of antennas, and
    wherein the sensor hub is further configured to output the at least one control signal for selecting the at least one antenna of which the capacitance change is relatively small.

4. The electronic device of claim 1,
wherein the physical quantity or physical charges further include a capacitance change regarding the plurality of antennas, and
wherein the sensor hub is further configured to output the at least one control signal for increasing the weight for the Rx signal and/or the Tx signal through an antenna of which the capacitance change is relatively high, and output the at least one control signal for decreasing the weight for the Rx signal and/or the Tx signal through an antenna of which the capacitance change is relatively low.

5. The electronic device of claim 1, wherein the sensor hub is further configured output the at least one control signal for regulating Tx power of at least one antenna.

6. The electronic device of claim 1, wherein the sensor hub is further configured to identify a surrounding situation from the output from the at least one sensor, and output the at least one control signal corresponding to the surrounding situation.

7. The electronic device of claim 1, wherein the at least one sensor is configured to derive the output by using the plurality of antennas as a sensing medium.

8. The electronic device of claim 1, wherein the at least one sensor is configured to derive the output by using at least one metal body disposed in an adjacent manner to the plurality of antennas as a sensing medium.

9. The electronic device of claim 1, wherein the at least one sensor includes at least one of a gesture sensor, an acceleration sensor, a gyro sensor, a magnetic sensor, a grip sensor, a proximity sensor, a Red, Green, Blue (RGB) sensor, a bio sensor, a pressure sensor, a temperature/humidity sensor, an illumination sensor, and an Ultra Violet (UV) sensor.

10. The electronic device of claim 1, wherein the RF components use at least one of communication schemes of Single Input Single Output (SISO), Single Input Multiple Output (SIMO), Multiple Input Single Output (MISO), diversity, and Multiple Input Multiple Output (MIMO).

11. An electronic device comprising:
a Micro Controller Unit (MCU) configured to output at least one control signal in response to outputs from a plurality of sensors, wherein the MCU is configured to:
acquire a plurality of pieces of information from the plurality of sensors, wherein the plurality of pieces of information include a Received Signal Strength Indication (RSSI) for a plurality of antennas, and
generate the at least one control signal for controlling wireless communication from the plurality of pieces of information,
wherein the MCU is configured to output the at least one control signal for increasing a weight for a Receive (Rx) signal and/or a Transmit (Tx) signal through an antenna of which the RSSI is relatively high, and output the at least one control signal for decreasing the weight for the Rx signal and/or the Tx signal through an antenna of which the RSSI is relatively low, and
Radio Frequency (RF) components configured to control wireless communication using the plurality of antennas in response to the at least one control signal, wherein the RF components are configured to apply weights for (Rx) signals and/or Tx signals through the plurality of antennas in response to the at least one control signal.

12. The electronic device of claim 11,
wherein the RF components are further configured to select at least one antenna used in the wireless communication from among the plurality of antennas, or regulate Tx power of at least one antenna in response to the at least one control signal.

13. The electronic device of claim 11,
wherein the RF components are further configured to select at least one of communication schemes of Single Input Single Output (SISO), Single Input Multiple Output (SIMO), Multiple Input Single Output (MISO), diversity, and Multiple Input Multiple Output (MIMO) in response to the at least one control signal.

* * * * *